P. J. HARVEY.
VEHICLE-WHEEL.
No. 178,238. Patented June 6. 1876.
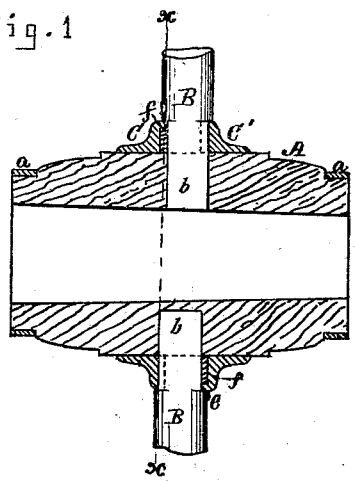
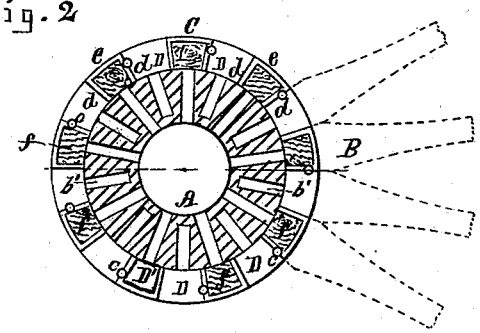
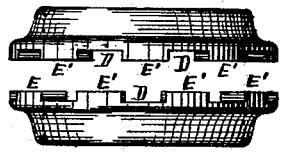
WITNESSES:
Julius Wilcke
N. Cowles
INVENTOR:
Perrey J. Harvey
By Gridley & Sherburne
Attys

UNITED STATES PATENT OFFICE.

PERREY J. HARVEY, OF CHICAGO, ILLINOIS.

IMPROVEMENT IN VEHICLE-WHEELS.

Specification forming part of Letters Patent No. 178,238, dated June 6, 1876; application filed May 8, 1876.

*To all whom it may concern:*

Be it known that I, PERREY J. HARVEY, of Chicago, in the county of Cook and State of Illinois, have invented certain new and useful Improvements in Vehicle-Wheels; and I do hereby declare the following to be a full, clear, and exact description thereof, which will enable others skilled in the art to which my invention appertains to make and use the same, reference being had to the accompanying drawing, forming part of this specification, in which—

Figure 1 represents a longitudinal central section of a vehicle-wheel hub embodying my invention. Fig. 2 represents a transverse section of the same taken on the line $x\ x$ drawn across Fig. 1; and Fig. 3 is an edge view of the collars employed in securing the spokes.

Like letters of reference indicate like parts.

My invention relates to that class of vehicle-wheels in which the spokes are secured to and within the hub by metal collars fitted around the hub, and recessed to receive the spokes, so that each alternate spoke shall project to the right and left in separate planes around the hub; and the object of my invention is to reduce the weight of the collars, and to render the spokes firm and secure in the hub.

To that end my invention consists in providing the faces of the collars with inwardly-projecting flanges, between which is a filling of wood arranged in each alternate space, and adapted to bear against the edge of each alternate spoke resting within the recess between the flanges of the opposite collar, as is hereinafter more fully described.

In the drawing, A represents the body of the hub, which is made of wood, and encircled at each end by metal bands $a\ a$ in the usual manner. B represents the spokes, which are provided with tenons $b$, adapted to enter corresponding mortises $b'$ in the hub. C and C' are metal collars, fitted upon and around the central portion of the body A, as shown in Fig. 1. Each of the collars is provided with inwardly-projecting flanges $d\ d$, united at the periphery by a like flange, $e$, as shown in Fig. 2, so as to form a series of recesses, D, adapted to receive one edge of each alternate spoke and a series of recesses, D', within each of which is arranged a filling of wood, $f$, forming projections E', adapted to bear against one edge of each alternate spoke, as shown in Fig. 3. $c\ c$ are bolts or rivets which pass through the collars C C' upon alternate sides of each spoke, for the purpose of connecting the collars together, and are so arranged relative to each other on the body A as to bring the projections E of one collar directly opposite to the recesses D of the other, and so that the filling $f$ bears upon or against opposite edges of each alternate spoke in such a manner as to compress them into the recesses in the other collar, thereby holding the spokes firmly in place in connection with the bolts, which prevent the spokes from becoming loose and working out.

By making the collars, as described, they are rendered much lighter than when the projections are made of solid metal, and the spokes are less liable to wear and become loosened than when the metal is in direct contact with both edges of the spoke.

Having thus described my invention, what I claim as new, and desire to secure by Letters Patent, is—

The combination, with the body A of the hub, of the collars C and C', provided with the flanges $d\ d$ and $e$, forming the recesses D to receive the spokes, and the filling $f$ of wood forming the projections E', adjusted to bear against opposite sides of each alternate spoke, substantially as and for the purpose specified.

PERREY J. HARVEY.

Witnesses:
 WHEELER BARTRAM,
 N. H. SHERBURNE.